United States Patent [19]
Hayes

[11] Patent Number: 5,925,960
[45] Date of Patent: Jul. 20, 1999

[54] ELECTRIC MOTOR

[75] Inventor: Phillip E. Hayes, Gastonia, N.C.

[73] Assignee: Reliance Electric Industrial Company, Cleveland, Ohio

[21] Appl. No.: 08/887,113

[22] Filed: Jul. 2, 1997

[51] Int. Cl.$^6$ ............................ H02K 17/16; H02K 9/00; H02K 1/32

[52] U.S. Cl. ............................ 310/211; 310/63; 310/61; 310/60 A; 29/889.3; 29/889.4

[58] Field of Search ...................................... 310/211, 125, 310/60 A, 63, 62, 61, 59, 58, 262, 263, 60 R, 52, 64, 65; 110/162; 165/87; 29/889.3, 889.4; 416/179

[56] References Cited

U.S. PATENT DOCUMENTS

| | | | |
|---|---|---|---|
| 3,832,583 | 8/1974 | Chang | 310/201 |
| 4,797,602 | 1/1989 | West | 322/10 |
| 5,144,175 | 9/1992 | Craggs | 310/63 |
| 5,655,361 | 8/1997 | Kishi | 60/266 |
| 5,789,833 | 8/1998 | Kinishita et al. | 310/64 |

*Primary Examiner*—Nestor Ramirez
*Assistant Examiner*—Dane Dinh Le
*Attorney, Agent, or Firm*—Lloyd G. Farr; John M. Miller; John J. Horn

[57] ABSTRACT

An electric motor comprises a stator having a plurality of conductive windings radially spaced about a central axis. The motor includes a rotor located radially inward of the stator and rotationally fixed with respect to a shaft disposed along the central axis. The rotor defines an area in which, upon rotation of the rotor, a low pressure vacuum is created drawing air radially outward, with respect to the rotor, from the area. The rotor also includes an annular plate disposed at a transverse end of the rotor coaxial with the shaft. The annular plate defines at least one hole extending axially through the annular plate and in pneumatic communication with the area. The hole is configured so air is drawn by the low pressure vacuum through the hole to the area.

29 Claims, 4 Drawing Sheets

ELECTRIC MOTOR

BACKGROUND OF THE INVENTION

The present invention relates generally to the art of electric motors, which should be understood as described herein to include generators and other electromechanical machines which effect a conversion between mechanical and electrical power. More particularly, the invention relates to an arrangement for providing improved air flow within an electric motor.

Rotors of electric motors often include areas in which pressure systems are created during the motor's operation. For example, in a motor having a fabricated bar rotor, conductive bars, for example made from aluminum or copper, extend through the rotor core parallel to and radially spaced from the rotor central axis. The rotor bars are equally spaced apart from each other to form a "squirrel cage" arrangement. The ends of the bars extend beyond either end of the rotor core. Each end of these bar extensions are electrically connected by a conductive annular ring, for example made from the same conductive material as the bars. A fan is typically disposed on the shaft outboard of each annular ring. The fan generally has an annular base portion extending radially outward from the shaft.

Thus, a gap is defined between the ends of the rotor core and each annular fan base portion. Each gap is radially bounded by the bar extensions. As the rotor rotates, negative pressure is created at the inner diameter of the bar extensions tending to draw air from the gap radially outward to positive pressure at the rotor outer diameter.

Generally, however, these negative pressures are unable to draw air into the vacuum to then push out to the rotor outer diameter. For example, the fan base portions are typically solid, possibly except for bore holes to provide access to bolts holding the rotor core together when the core is constructed as a stack of annular steel laminations. These relatively small bore holes, however, do not generally permit air flow into the low pressure vacuum gaps.

Such air flow may be prevented, for example, by pressure drop losses and windage friction. Pressure drop losses result primarily from restricted air flow outlets from the stator. Air pushed radially outward from the fan blades generally flows either through a gap between the rotor and the stator or around the coil head windings. Air flowing through the air gap between the rotor and the stator exits the stator through stator ducts. Air flowing around the coil head windings exit a side exhaust. Because of the compact winding arrangement, the stator ducts' size is limited. Consequently, the alternate air flow path over the coil head windings to the side exhaust is designed to achieve an appropriate pressure drop to force air through the stator/rotor air gap to cool the motor core. This restricts the overall air flow path out of the motor and provides resistance to air that might be pushed from within the cage inner diameter by the negative pressure. This, in turn, reduces the ability of the negative pressure to draw air into the cage inner diameter through the bore holes. Windage friction, which is friction between air and the fan base portion face proximate the bore holes, also inhibits air flow into the gaps.

Since no air is drawn into the gaps, the negative pressure at the cage inner diameter does not contribute to the air flow that cools the motor. While it should be understood that a negligible amount of air may pass through the bore hole of such fans, such air flow, if it occurs, does not measurably increase air flow within and out of the motor as measured by standard methods. Thus, for purposes of the present disclosure, any such air flow is considered nonexistent.

SUMMARY OF THE INVENTION

The present invention recognizes and addresses the foregoing disadvantages, and others, of prior art construction and methods.

Accordingly, it is an object of the present invention to provide an improved electric motor.

More particularly, it is an object of the present invention to provide an electric motor with improved cooling air flow.

It is a still further object of the present invention to provide an electric motor having fan plates which permit air flow into a low pressure vacuum created at the rotor cage inner diameter and the fan.

Some of these objects are achieved by an electric motor comprising a stator having a plurality of conductive windings radially spaced about a central axis. The electric motor includes a rotor located radially inward of the stator and rotationally fixed with respect to a shaft disposed along the central axis. The rotor defines an area in which, upon rotation of the rotor, a low pressure vacuum is created drawing air radially outward, with respect to the rotor, from the area. The rotor includes an annular plate disposed at a transverse end of the rotor coaxial with the shaft. The annular plate defines at least one hole extending axially through the annular plate and in pneumatic communication with the area. The hole is configured so that air is drawn by the low pressure vacuum through the hole to the area.

In a preferred embodiment, the rotor includes a generally cylindrical core section coaxial with the shaft. A plurality of elongated conductive elements extend through the core section in an axial direction generally parallel to the shaft and extending axially beyond opposite transverse ends of the core. A pair of annular conductive rings are coaxial with the shaft and electrically connect the conductive elements extending from respective core transverse ends. Each of a pair of fans is axially adjacent a respective conductive ring and includes an annular base portion coaxial with the shaft and a plurality of fan blades extending axially from the annular base portion away from the core section. A gap is defined between each transverse core end and a fan base portion. Each gap is radially bounded by the conductive elements, the conductive elements creating a low pressure vacuum within each gap when the rotor rotates. Each annular base portion defines a plurality of equally spaced apart holes, each extending axially through the annular base portion of its fan and in pneumatic communication with the respective gap. The elongated holes are configured so that air is drawn through the holes to the gap.

The annular base portion of each fan has a substantially planar axially outward face and a substantially planar axially inward face. A first angular side portion of each elongated hole is disposed at a first acute angle with respect to the axially outward face. A second angular side portion of each elongated hole is disposed at a second acute angle with respect to the axially inward face. In another preferred embodiment, these acute angles are approximately equal, at approximately 62°.

The accompanying drawings, which are incorporated by and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary in the art, is set forth in the specification, which makes reference to the appended drawings, in which.

Figure 1A:
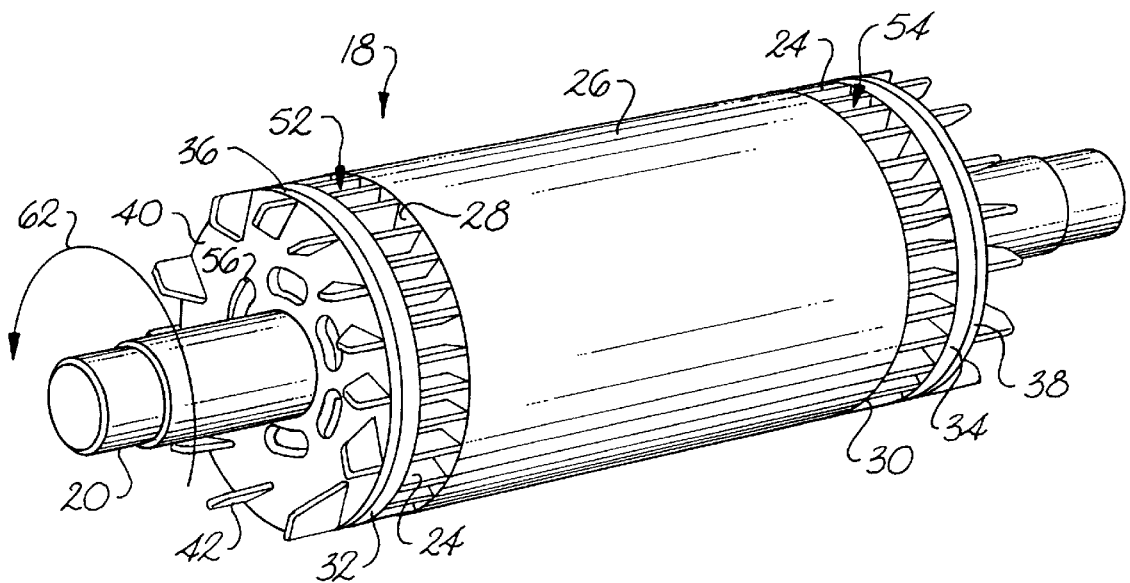
FIG. 1A is a perspective view of a rotor for use in an electric motor constructed in accordance with the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 3:
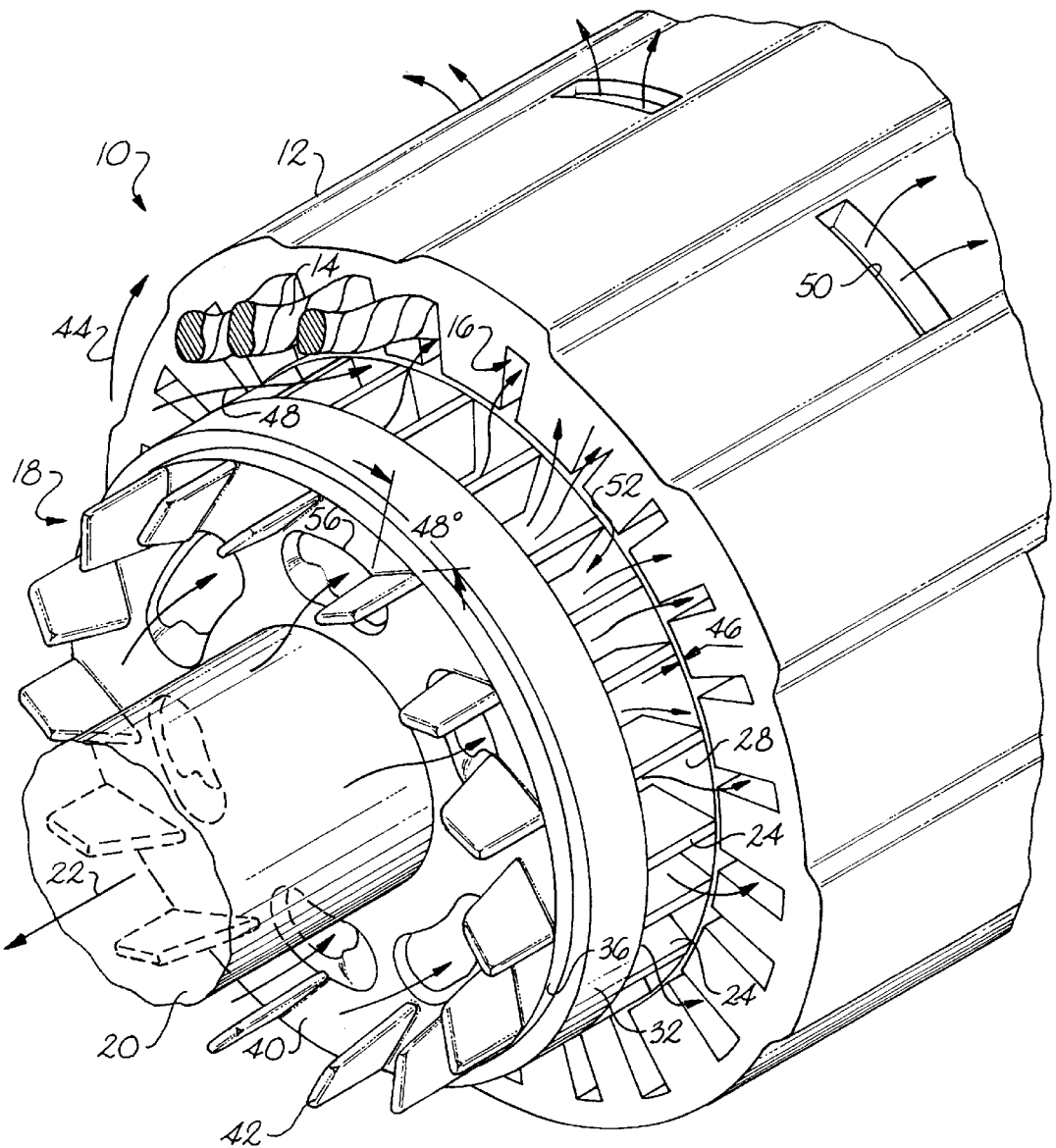
FIG. 3 is a partial perspective view of an electric motor constructed in accordance with the present invention.

The present invention is concerned with an improved electric motor. Accordingly, FIG. 3 depicts a presently preferred embodiment of an electric motor, shown generally at 10. While the term "motor" is used throughout the present specification, including the appended claims, it should be understood that this term includes any suitable electromechanical device effecting a conversion between mechanical and electrical power, for example including a generator.

Motor 10 includes a stator 12 having a plurality of windings 14 disposed in radial slots 16 extending axially through the stator. While only three windings 14 are illustrated, it should be understood that windings may be disposed in all the slots 16. The construction of a stator such as stator 12 should be well understood in this art and, therefore, is not described in detail herein. However, in one presently preferred embodiment, the stator is constructed by a stack of thin annular steel laminations, from which slots 16 are cut in a well understood manner. The rotor core, described in more detailed below, may also be constructed by a lamination stack.

A rotor, indicated generally at 18, is disposed radially inward of stator 12 and is rotationally fixed to a shaft 20. Shaft 20, rotor 18 and stator 12 are axially centered about a central axis 22.

The operation of devices such as motor 10 should be well understood in this art. Briefly, however, appropriate application of current through windings 14 produces a rotating magnetic field in the interior of stator 12. The rotating magnetic field induces electric current in bars 24 which extend through slots in the rotor core in the axial direction generally parallel to shaft 20 and the inner diameter of stator 12. The induced current produces a magnetic field which follows the moving magnetic field created by the windings 14. This causes the rotor to rotate, in turn rotating shaft 20. If motor 10 is used as a generator, the stator is energized to produce an emf, and shaft 20 is rotated above the synchronous frequency, thereby inducing electric current in the bars 24.

Figure 1B:
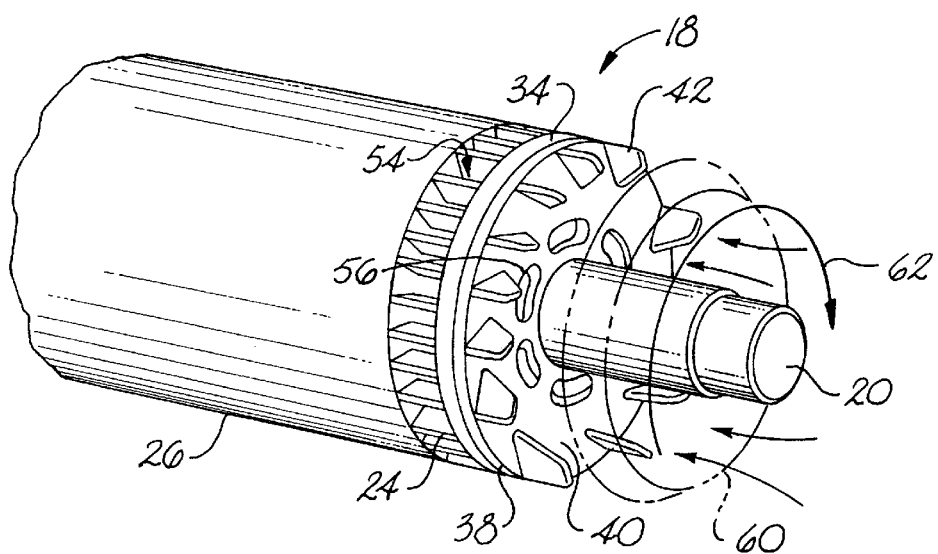
FIG. 1B is a partial perspective view of the rotor illustrated in FIG. 1A showing the outward face of the rear fan.

Rotor 18 is illustrated, without the stator, in FIGS. 1A and 1B. The rotor is comprised of a core section 26 constructed, for example, from a stack of annular steel laminations as described above. Radial notches cut in each lamination form slots extending axially through core 26. The conductive bars, for example constructed from copper or aluminum, extend through these slots. The bars extend beyond opposing transverse ends 28 and 30 of core 26. Annular conductive rings 32 and 34 are connected to the axial ends of the bar extensions. The annular rings are preferably made of the same conductive material of the bars 24 and, as should be well understood in this art, electrically connect the bars to permit current flow.

Fans 36 and 38 are mounted to the shaft, for example by interference fit, set screw and key, set screw and snap ring, or any suitable mechanism, axially adjacent to annular plates 32 and 34, respectively. Each fan includes an annular base portion 40 and a plurality of radially disposed fan blades 42. In one embodiment, there is an approximately one-eighth inch gap between the base portions of the fans, which are made from cast aluminum, and the respective annular plates to allow for thermal expansion of the cage and rings. Each fan may, however, be attached to its corresponding annular ring by a suitable method, for example by brazing or unitary construction. The base portion 40 may extend to the same outer diameter as the annular ring members, as shown in FIGS. 1A and 1B, or may have a smaller outer diameter, as shown in FIG. 3.

Rotor 18 is rotationally fixed to shaft 20 by an interference fit between core 26 and the shaft. Accordingly, as core 26 rotates to follow the stator's rotating magnetic field, the shaft and the rotor fans 36 and 38 are also rotated. During rotation, fan blades 42 create a pressure drop from the outer diameter of the blades to the inner diameter. Specifically, a negative pressure at the fan blade inner diameter relative to positive pressure at the outer diameter moves air radially outward from the rotor. The motor is encased in a housing (not shown), and air is drawn into the motor housing through a cone-shaped air-deflector (not shown). Because the motor is encased by the motor housing, the air flow is restricted. Specifically, referring to FIG. 3, it is directed either over the coil head windings (not shown), as indicated by arrow 44, or between the stator and the rotor through air gap 46, as indicated by arrow 48. Air is generally prevented from flowing through the slots 16 by the windings and by fiberglass "top" sticks (not shown) inserted into the slots to hold the windings in place. Air flowing over the coil head windings exits the housing through a side exhaust, whereas air flowing through the air gap exits the stator through stator ducts 50.

As discussed above, the amount of air which may be directed through stator ducts 50 is limited by the stator construction. Since the air flowing between the rotor and stator serves to cool the motor core, the flow path over the coil head windings is designed to create an appropriate pressure drop to force a suitable amount of air between the stator and rotor. The design of such flow paths should be understood in the art, and the particular dimensions of, for example, the air gap, side exhausts and stator ducts may depend on a variety of factors, for example motor size and design. Thus, the resistance to air flow away from the rotor will depend on these factors. The motor illustrated in FIG. 3, for example, is representative of a 5800 frame size electric motor having a stator outer diameter of slightly over 27 inches. The gap between the stator and rotor is approximately 0.11 inches.

To reduce noise, radially disposed fan blades 42 are pivoted. More specifically, in the embodiment illustrated in FIG. 3, the angle between a radius of base portion 40 passing through the center of each blade 42 and the longitudinal center line of the blade is approximately 48°.

Referring also to FIGS. 1A and 1B, the portions of bars 24 extending axially beyond transverse ends 28 and 30 of core 26 also create a fan action tending to draw air radially out of the gaps 52 and 54 defined between the annular rings and the transverse core ends. More specifically, a negative pressure at the inner diameter of the bar extensions is created relative to the outer diameter in a manner similar to that described above with respect to the fan blades. This creates a low pressure vacuum in gaps 52 and 54, specifically at the cage inner diameter. A plurality of elongated holes 56 are provided in annular base portions 40 of the fans to permit air flow into gaps 52 and 54. This air is then moved radially outward from the gaps beyond the bar extension to increase air flow to cool the motor core. The design illustrated in the figures results in an approximately 5% air flow increase in the 5800 frame size motor.

Figure 2:
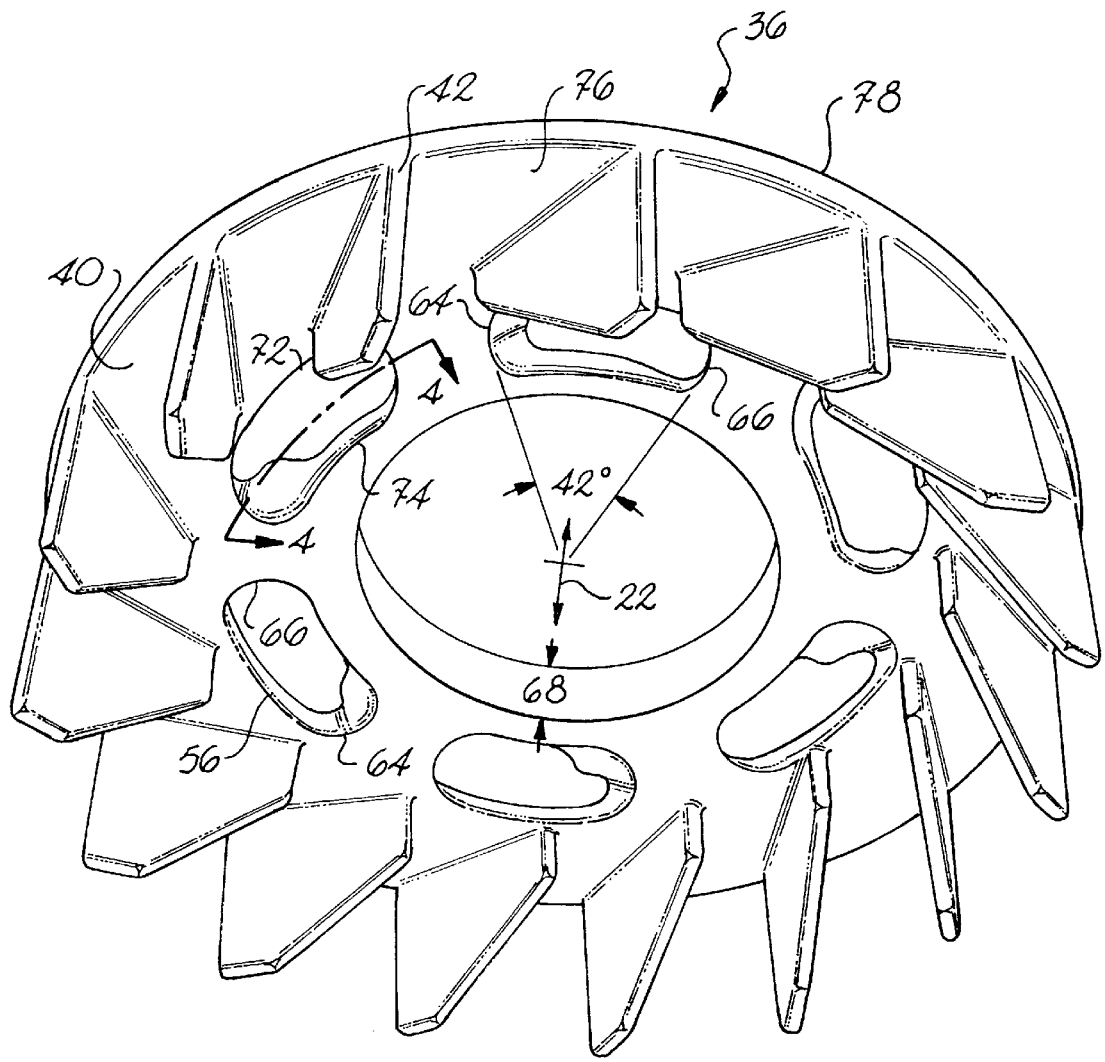
FIG. 2 is a perspective view of an electric motor fan constructed in accordance with the present invention.

FIG. 2 provides an enlarged view of rotor fan 36. Rotor fan 38 (FIG. 1A) has a similar construction, except that the slant directions of the fan blades 42 and the angular sides of the holes 56 are reversed. Since the fans face in opposite axial directions, but rotate in the same angular direction 62 (FIGS. 1A and 1B), the fan blades and holes on each fan operate in a similar manner.

Annular base portion 40 defines six holes 56 extending therethrough. The kidney shaped holes are equally spaced about the annular base portion. In the embodiment illustrated, the angular width of each hole 56, from one angular edge 64 to the opposite angular edge 66, is approximately 42°. The angular distance between adjacent angular edges 64, and between adjacent angular edges 66, is approximately 60°. The depth 68 of central portion 40 is approximately one inch, although in this embodiment the depth reduces to approximately 0.44 inches shortly beyond the inner diameter of the fan blades 42. This produces a groove extending from the base portion outer diameter radially inward approximately 2.5 inches on the underside of base portion 40 to receive annular ring 32 (FIG. 3).

Moreover, it should be understood that the rotor fan and the conductive annular ring may be constructed in various suitable manners, for example as discrete components or as a unitary structure. Also, as shown in the figures, the conductive ring may be constructed so that it has an inner diameter greater than the outer diameter of the holes 56 so that the holes extend only through base portion 40. The conductive ring may also be constructed, however, with a smaller inner diameter so that the holes extend both through the fan base portion 40 and the ring. In either arrangement, the holes extend axially through the annular base portion 40 and are in pneumatic communication with the gaps defined between the ends of the rotor core and the fan base portion.

The height of the fan blades 42 from base portion 40 at the fan blade outer diameter is approximately 2.88 inches. The height of each fan blade at the fan blade inner diameter is approximately 1 inch. The distance between central axis 22 and the outer radial side 72 of each hole 56 is approximately 4.62 inches. The distance between central axis 22 and inner radial side 74 is approximately 3.38 inches. The diameter of base portion 40 is approximately 13.25 inches. The particular construction of the rotor fan is described for exemplary purposes, not for purposes of limitation. It should be understood by those of ordinary skill in this art that various suitable fan configurations are possible depending, for example, upon motor size. All such suitable configurations are within the scope and spirit of the present invention.

Figure 4:
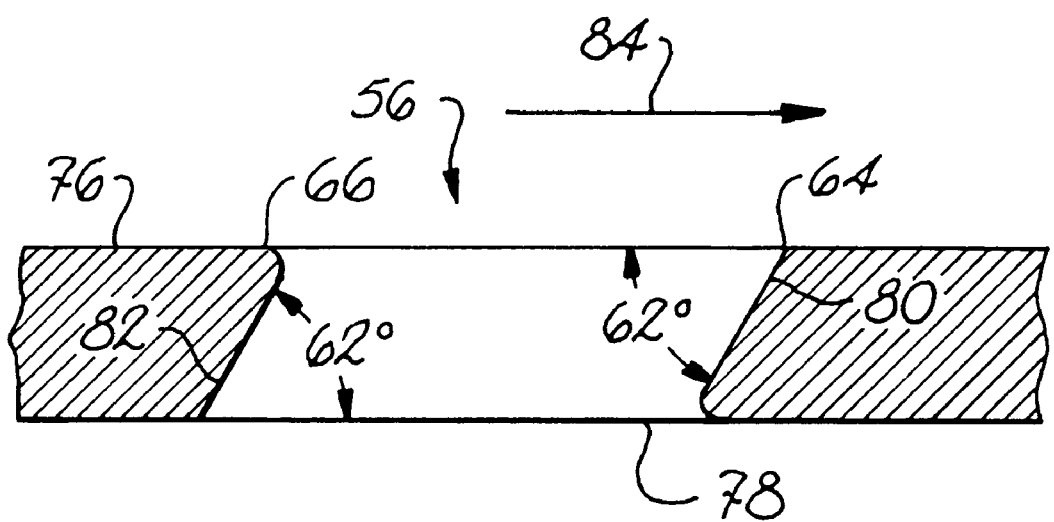
FIG. 4 is a partial cross-sectional view of the rotor fan illustrated in FIG. 3 taken along the line 4—4.

Referring now to FIG. 4, angular side portions 80 and 82 extend from edges 64 and 66, respectively, of holes 56 from front face 76 to a rear face 78 of base portion 40 at an acute angle with respect to a plane normal to central axis 22 (FIGS. 2 and 3). In the illustrated embodiment, angular side portion 80 is disposed at an angle of approximately 62° with respect to a plane defined by the substantially planar surface of face 76. Angular side portion 82 is disposed at an angle of approximately 62° with respect to a plane defined by substantially planar face 78. It should be understood, however, that the side portions 80 and 82 may be disposed at other suitable angles with respect to the faces 76 and 78. For example, 45° or 50° may be appropriate. Also, the side portions need not be disposed at the same angle. For example, the holes may be constructed so that side portion 82 is disposed at an approximately 45° angle with respect to face 78 while side portion 80 remains at approximately 62° with respect to face 76. The rotational direction of fan 36 (FIG. 3) is indicated by arrow 84.

When fan 36 is rotated in the direction of arrow 84, the angular displacement of side portions 80 and 82 encourages air flow into the hole 56 from face 76 to face 78, and thus into gap 52 (FIG. 3). Moreover, the configuration of holes 56, including their length and width, reduces windage friction so that the low pressure vacuum in gap 52 is able to draw air through the hole. This air may then be moved radially outward between the extensions of bars 24 (FIG. 3) to contribute to the air flow cooling the motor core.

While one or more preferred embodiments of the invention have been described above, it should be understood that any and all equivalent realizations of the present invention are included within the scope and spirit thereof. For example, the present invention may be used in conjunction with various motor constructions, including cast rotor designs. Furthermore, various suitable configurations of holes through an annular plate, for example an annular base portion of a fan, are possible. For example, while the angular side portions 80 and 82 illustrated in FIG. 4 are substantially straight, it should be understood that the sides may curve. Since such curved portions are acutely angled with respect to the face planes substantially over their entire length from one face to the other, each is disposed at an acute angle with respect to its plane. Thus, it should be understood by those of ordinary skill in this art that the present invention is not limited to these embodiments since modifications can be made. Therefore, it is contemplated that any and all such embodiments are included in the present invention which may fall within the literal or equivalent scope of the appended claims.

What is claimed is:

1. An electric motor, said motor comprising:

a stator having a plurality of conductive windings radially spaced about a central axis; and a rotor located radially inward of said stator and rotationally fixed with respect to a shaft disposed along said central axis, said rotor defining an area in which, upon rotation of said rotor, a low pressure vacuum is created drawing air radially outward, with respect to said rotor, from said area, wherein said rotor includes an annular plate disposed at a transverse end of said rotor coaxial with said shaft, and wherein said annular plate defines at least one hole extending axially through said annular plate between radially inner and outer edges of said annular plate and in pneumatic communication with said area, said hole including at least one side portion disposed at an acute angle with respect to a plane normal to said central axis so that air is drawn by said low pressure vacuum through said hole to said area.

2. The motor as in claim 1, wherein said rotor includes a generally cylindrical core section coaxial with said shaft and a plurality of elongated conductive elements extending through said core section in an axial direction generally parallel to said shaft and extending axially beyond a transverse end of said core.

3. The motor as in claim 2, wherein said conductive elements are bars.

4. The motor as in claim 2, wherein said annular plate is disposed adjacent to said conductive elements to form a gap between said transverse end of said core section and said annular plate, said gap being radially bounded by said conductive elements and said conductive elements creating said low pressure vacuum within said gap when said rotor rotates about said axis.

5. The motor as in claim 4, wherein said annular plate includes an annular conductive ring and an annular base member, said annular conductive ring being coaxial with said shaft and electrically connecting said conductive elements, and said annular base member being disposed axially adjacent said annular conductive ring.

6. The motor as in claim 5, wherein said annular conductive ring has an inner radius greater than the radial distance between said central axis and the radially outermost edge of said hole.

7. The motor as in claim 5, wherein said annular conductive ring connects axial ends of said conductive elements and wherein said annular base member is adjacent said annular conductive ring on the side of said annular conductive ring opposite said conductive elements.

8. The motor as in claim 2, wherein said core is comprised of a stack of annular laminations.

9. The motor as in claim 1, wherein said annular plate includes a plurality of fan blades extending axially from said annular plate away from said transverse end.

10. The motor as in claim 1, including a plurality of said holes.

11. The motor as in claim 1, wherein said hole is elongated.

12. The motor as in claim 11, wherein said elongated hole is kidney shaped.

13. The motor as in claim 1, wherein said annular plate has a substantially planar axially outward face and wherein one of said at least one side portions is disposed with respect to said axially outward face at an angle of approximately 62 degrees.

14. The motor as in claim 1, wherein said side portion is an angular side portion of said hole.

15. The motor as in claim 1, wherein first and second angular side portions of said hole are disposed at an acute angle with respect to a plane normal to said central axis.

16. The motor as in claim 15, wherein said annular plate has a substantially planar axially outward face and a substantially planar axially inward face, wherein said first angular side portion is disposed at a first acute angle with respect to said axially outward face and wherein said second angular side portion is disposed at a second acute angle with respect to said axially inward face.

17. The motor as in claim 16, wherein said first acute angle and said second acute angle are approximately equal.

18. The motor as in claim 17, wherein each of said first acute angle and said second acute angle is approximately equal to 62 degrees.

19. An electric motor, said motor comprising:
  a stator having a plurality of conductive windings radially spaced about a central axis; and
  a rotor located radially inward of said stator and rotationally fixed with respect to a shaft disposed along said central axis, said rotor including
    a generally cylindrical core section coaxial with said shaft,
    a plurality of elongated conductive elements extending through said core section in an axial direction generally parallel to said shaft and extending axially beyond a transverse end of said core,
    an annular conductive ring coaxial with said shaft and electrically connecting said conductive elements, and
    a fan disposed axially adjacent said conductive ring and including an annular base portion coaxial with said shaft and a plurality of fan blades extending axially from said annular base portion away from said core section,
  wherein a gap is defined between said transverse end of said core section and said fan base portion, said gap being radially bounded by said conductive elements, and said conductive elements creating a low pressure vacuum within said gap when said rotor rotates, and
  wherein said annular base portion of said fan defines at least one hole extending axially through said annular base portion between radially inner and outer edges of said annular base portion and in pneumatic communication with said gap, said hole including at least one side portion disposed at an acute angle with respect to a plane normal to said central axis so that air is drawn by said low pressure vacuum through said hole to said gap.

20. The motor as in claim 19, including a plurality of said holes, each of said holes being elongated.

21. The motor as in claim 20, wherein each said elongated hole is kidney shaped.

22. The motor as in claim 20, wherein said annular base portion of said fan has a substantially planar axially outward face and a substantially planar axially inward face, wherein a first angular side portion of each said elongated hole is disposed at a first acute angle with respect to said axially outward face and wherein a second angular side portion of each said elongated hole is disposed at a second acute angle with respect to said axially inward face.

23. The motor as in claim 22, wherein said first acute angle and said second acute angle are approximately equal.

24. The motor as in claim 23, wherein each of said first acute angle and said second acute angle is approximately 62 degrees.

25. An electric motor, said motor comprising:
  a stator having a plurality of conductive windings radially spaced about a central axis; and
  a rotor located radially inward of said stator and rotationally fixed with respect to a shaft disposed along said central axis, said rotor including
    a generally cylindrical core section coaxial with said shaft,
    a plurality of elongated conductive elements extending through said core section in an axial direction generally parallel to said shaft and extending axially beyond opposite transverse ends of said core,
    a pair of annular conductive rings, each of said conductive rings being coaxial with said shaft and electrically connecting said conductive elements extending from respective said transverse ends of said core, and a pair of fans, each of said fans disposed axially adjacent a respective said conductive ring and including an annular base portion coaxial with said shaft and a plurality of fan blades extending axially from said annular base portion away from said core section, wherein a gap is defined between said each of said transverse ends of said core section and a respective said fan base portion, each of said gaps being radially bounded by said conductive elements, and said conductive elements creating a low pressure vacuum within each of said gaps when said rotor rotates, and wherein each said annular base portion defines a plurality of equally spaced apart elongated holes extending axially through said annular base portion and in pneumatic communication with its respective said gap, each of said elongated holes including at least one side portion disposed at an acute angle with respect to a plane normal to said central axis so that air is drawn by said low pressure vacuum through said holes to said gap.

26. The motor as in claim 25, wherein said annular base portion of each said fan has a substantially planar axially outward face and a substantially planar axially inward face, wherein a first angular side portion of each of said elongated holes is disposed at a first acute angle with respect to said axially outward face and wherein a second angular side portion of each said elongated hole is disposed at a second acute angle with respect to said axially inward face.

27. An electric motor, said motor comprising:

a stator having a plurality of conductive windings radially spaced about a central axis; and a rotor located radially inward of said stator and rotationally fixed with respect to a shaft disposed along said central axis, said rotor including a generally cylindrical core section coaxial with said shaft, a plurality of elongated conductive elements extending through said core section in an axial direction generally parallel to said shaft and extending axially beyond a transverse end of said core, and an annular plate coaxial with said shaft and connecting said conductive elements, wherein a gap is defined between said transverse end of said core section and said annular plate and being radially bounded by said conductive elements, and wherein said annular plate defines a plurality of equally spaced apart elongated holes extending axially through said annular plate and in pneumatic communication with said gap, said holes including at least one side portion disposed at an acute angle with respect to a plane normal to said central axis so that air passes through said holes to said gap during rotation of said rotor.

28. The motor as in claim 27, wherein each said elongated hole is kidney shaped.

29. The motor as in claim 27, wherein said annular plate has a substantially planar axially outward face and a substantially planar axially inward face, wherein a first angular side portion of each said elongated hole is disposed at a first acute angle with respect to said axially outward face and wherein a second angular side portion of each said elongated hole is disposed at a second acute angle with respect to said axially inward face.

* * * * *